(12) United States Patent
Khayyer et al.

(10) Patent No.: US 11,654,919 B2
(45) Date of Patent: May 23, 2023

(54) ADAPTIVE USER-SPECIFIC AUTOMATED DRIVER ASSISTANCE SYSTEM WARNINGS

(71) Applicant: APTIV TECHNOLOGIES LIMITED, St. Michael (BB)

(72) Inventors: Pardis Khayyer, Carmel, IN (US); Douglas L. Welk, Rossville, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 256 days.

(21) Appl. No.: 16/990,575

(22) Filed: Aug. 11, 2020

(65) Prior Publication Data

US 2022/0048517 A1 Feb. 17, 2022

(51) Int. Cl.
| | |
|---|---|
| *B60W 40/08* | (2012.01) |
| *G06V 20/59* | (2022.01) |
| *B60W 50/04* | (2006.01) |
| *B60W 50/14* | (2020.01) |
| *B60W 50/00* | (2006.01) |

(52) U.S. Cl.
CPC ............ *B60W 40/08* (2013.01); *B60W 50/04* (2013.01); *B60W 50/14* (2013.01); *G06V 20/597* (2022.01); *B60W 2040/0809* (2013.01); *B60W 2040/0827* (2013.01); *B60W 2040/0872* (2013.01); *B60W 2050/0075* (2013.01); *B60W 2540/221* (2020.02); *B60W 2540/225* (2020.02); *B60W 2556/10* (2020.02)

(58) Field of Classification Search
CPC . B60W 2040/0809; B60W 2040/0827; B60W 2040/0872; B60W 2050/0075; B60W 2050/143; B60W 2540/043; B60W 2540/221; B60W 2540/225; B60W 2540/30; B60W 2556/10; B60W 40/08; B60W 50/04; B60W 50/14; G06V 20/597
See application file for complete search history.

(56) References Cited

U.S. PATENT DOCUMENTS

| | | | | |
|---|---|---|---|---|
| 9,892,573 | B1 * | 2/2018 | Hsu-Hoffman | G07C 5/008 |
| 9,925,987 | B1 * | 3/2018 | Nguyen | G08G 1/0129 |
| 10,783,725 | B1 * | 9/2020 | Gaudin | G07C 5/008 |
| 11,312,298 | B2 * | 4/2022 | Farrell | G05D 1/0088 |
| 2014/0272811 | A1 * | 9/2014 | Palan | G07C 5/008 |
| | | | | 434/66 |

(Continued)

FOREIGN PATENT DOCUMENTS

| | | |
|---|---|---|
| EP | 2284057 B1 | 4/2020 |
| WO | 2016169585 A1 | 10/2016 |

*Primary Examiner* — Babar Sarwar
(74) *Attorney, Agent, or Firm* — RMCK Law Group, PLC

(57) ABSTRACT

Automated driver assistance systems (ADAS) and methods that provide user-specific ADAS warnings each involve determining an identity of the driver of the vehicle, accessing a memory configured to store a set of user profiles, each user profile defining a set of ADAS warnings, identifying a target user profile based on whether the driver identity corresponds to any of the set of user profiles, including accessing one of the set of stored user profiles or creating and storing a new user profile, and, during a period after identifying the target user profile, updating the set of ADAS warnings defined by the target user profile based on the vehicle's operation and providing ADAS warnings based on the set of ADAS warnings defined by the target user profile.

20 Claims, 2 Drawing Sheets

(56) References Cited

U.S. PATENT DOCUMENTS

| | | | |
|---|---|---|---|
| 2015/0081404 A1* | 3/2015 | Basir | G06Q 30/08 |
| | | | 705/14.1 |
| 2015/0166059 A1* | 6/2015 | Ko | B60T 7/22 |
| | | | 701/28 |
| 2016/0009295 A1* | 1/2016 | Chun | A61B 5/6893 |
| | | | 701/32.9 |
| 2017/0032673 A1* | 2/2017 | Scofield | G08G 1/093 |
| 2017/0072850 A1* | 3/2017 | Curtis | G08G 1/166 |
| 2017/0221150 A1* | 8/2017 | Bichacho | G06Q 40/08 |
| 2017/0261990 A1* | 9/2017 | Lei | B60W 50/14 |
| 2017/0292848 A1* | 10/2017 | Nepomuceno | G01C 21/3492 |
| 2017/0369073 A1* | 12/2017 | Huber | B60W 30/16 |
| 2019/0202477 A1* | 7/2019 | Kapuria | G06V 20/59 |
| 2020/0342756 A1* | 10/2020 | MacKenzie | G08G 1/16 |
| 2021/0048815 A1* | 2/2021 | McErlean | B60W 50/14 |
| 2021/0053579 A1* | 2/2021 | Gaudin | B60W 50/045 |
| 2022/0081009 A1* | 3/2022 | Oba | B60W 60/0053 |

* cited by examiner

ADAPTIVE USER-SPECIFIC AUTOMATED DRIVER ASSISTANCE SYSTEM WARNINGS

FIELD

The present disclosure generally relates to vehicle automated driver assistance systems (ADAS) and, more particularly, to adaptive user-specific ADAS warnings.

BACKGROUND

An automated driver assistance system ("ADAS") is an electronic system configured to assist a driver while operating a vehicle (driving, parking, etc.). Examples of ADAS features include, but are not limited to, adaptive cruise control (ACC), collision avoidance, lane departure and blind spot monitoring, and lane keeping or centering. One aspect of an ADAS feature may include a warning for the driver of the vehicle, such as a visual display, an audible sound, a tactile feedback, or some combination thereof. It will be appreciated that different drivers may react to different warnings in different manners. Conventional ADAS system warnings, however, are typically default or predetermined settings. Such user-generic warnings, however, may not be the most appropriate way to get the attention of a particular driver of the vehicle. As a result, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an automated driver assistance system (ADAS) for a vehicle is presented. In one exemplary implementation, the ADAS comprises one or more systems configured to determine a set of parameters indicative of an identity of a driver of the vehicle, and a controller configured to determine an identity of the driver based on the set of parameters, access a memory configured to store a set of user profiles, each user profile defining a set of ADAS warnings, identify a target user profile based on whether the driver identity corresponds to any of the set of user profiles, including when the driver identity does not correspond to any of the set of user profiles, create and store the target user profile as one of the set of user profiles at the memory, wherein the set of ADAS warnings defined by the target user profile includes a set of default or predetermined ADAS warnings, and when the driver identity does correspond to one of the set of user profiles, access that user profile as the target user profile, wherein the set of ADAS warnings defined by the target user profile include user-specific ADAS warnings for the driver of the vehicle, and, during a period after identifying the target user profile, updating the set of ADAS warnings defined by the target user profile based on the vehicle's operation, and providing ADAS warnings based on the set of ADAS warnings defined by the target user profile.

In some implementations, the controller is configured to update a particular ADAS warning of the set of ADAS warnings based on a response rate of the driver to the particular ADAS warning and a calibratable response rate threshold. In some implementations, the controller is configured to update a particular ADAS warning of the set of ADAS warnings based on a number of response failure instances of the driver to the particular ADAS warning and a calibratable response failure instance threshold.

In some implementations, the controller is configured to update the set of ADAS warnings based on other driver-specific factors monitored by the driver monitoring system including at least one of (i) a gaze of the driver relative to a road, (ii) a level of drowsiness of the driver, and (iii) a health status of the driver. In some implementations, the controller is configured to update the set of ADAS warnings based on other non-driver-specific factors including at least one of (i) a current road traffic level and (ii) a current road construction level.

In some implementations, the controller is configured to update a particular ADAS warning of the set of ADAS warnings by changing an output type of the ADAS warning. In some implementations, the output type of the ADAS warning is one of a visual output, an audible output, and a haptic output. In some implementations, the one or more systems comprise a driver monitoring system configured to monitor a driver of the vehicle.

According to another aspect of the present disclosure, a method for determining and providing adaptive user-specific ADAS warnings for a vehicle is presented. In one exemplary implementation, the method comprises determining, by a controller of the vehicle, an identity of the driver of the vehicle, accessing, by the controller, a memory configured to store a set of user profiles, each user profile defining a set of ADAS warnings, identifying, by the controller, a target user profile based on whether the driver identity corresponds to any of the set of user profiles, including when the driver identity does not correspond to any of the set of user profiles, creating and storing the target user profile as one of the set of user profiles at the memory, wherein the set of ADAS warnings defined by the target user profile includes a set of default or predetermined ADAS warnings, and when the driver identity does correspond to one of the set of user profiles, accessing that user profile as the target user profile, wherein the set of ADAS warnings defined by the target user profile include user-specific ADAS warnings for the driver of the vehicle, and, during a period after identifying the target user profile, updating, by the controller, the set of ADAS warnings defined by the target user profile based on the vehicle's operation, and providing, by the controller, ADAS warnings based on the set of ADAS warnings defined by the target user profile.

In some implementations, the updating of a particular ADAS warning of the set of ADAS warnings is based on a response rate of the driver to the particular ADAS warning and a calibratable response rate threshold. In some implementations, the updating of a particular ADAS warning of the set of ADAS warnings is based on a number of response failure instances of the driver to the particular ADAS warning and a calibratable response failure instance threshold.

In some implementations, the updating of the set of ADAS warnings is based on other driver-specific factors monitored by the driver monitoring system including at least one of (i) a gaze of the driver relative to a road, (ii) a level of drowsiness of the driver, and (iii) a health status of the driver. In some implementations, the updating of the set of ADAS warnings is based on other non-driver-specific factors including at least one of (i) a current road traffic level and (ii) a current road construction level.

In some implementations, the updating of a particular ADAS warning of the set of ADAS warnings includes changing an output type of the ADAS warning. In some implementations, the output type of the ADAS warning is one of a visual output, an audible output, and a haptic output. In some implementations, the determining of the identity of the driver of the vehicle is performed using a driver monitoring system configured to monitor a driver of the vehicle.

According to yet another aspect of the present disclosure, an ADAS for a vehicle is presented. In one exemplary implementation, the ADAS comprises identity determination means for determining an identify of the driver, user profile storage means for accessing and storing a set of user profiles, each user profile defining a set of ADAS warnings, target user profile identification means for identifying a target user profile based on whether the driver identity corresponds to any of the set of user profiles, including when the driver identity does not correspond to any of the set of user profiles, creating and storing the target user profile as one of the set of user profiles at the user profile storage means, wherein the set of ADAS warnings defined by the target user profile includes a set of default or predetermined ADAS warnings, and when the driver identify does correspond to one of the set of user profiles, accessing that user profile as the target user profile, wherein the set of ADAS warnings defined by the target user profile include user-specific ADAS warnings for the driver of the vehicle, ADAS warning updating means for, during a period after identifying the target user profile, updating the set of ADAS warnings defined by the target user profile based on the vehicle's operation, and ADAS warning provision means for providing ADAS warnings based on the set of ADAS warnings defined by the target user profile.

In some implementations, the ADAS warning updating means updates a particular ADAS warning of the set of ADAS warnings based on a response rate of the driver to the particular ADAS warning and a calibratable response rate threshold. In some implementations, the ADAS warning updating means updates a particular ADAS warning of the set of ADAS warnings based on a number of response failure instances of the driver to the particular ADAS warning and a calibratable response failure instance threshold. In some implementations, the ADAS warning updating means updates a particular ADAS warning of the set of ADAS warnings by changing an output type of the ADAS warning, wherein the output type of the ADAS warning is one of a visual output, an audible output, and a haptic output.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, there exists an opportunity for improvement in the art of advanced driver assistance systems (ADAS) for vehicles. Accordingly, improved vehicle ADAS and corresponding methods are presented herein. These techniques provide adaptive user-specific ADAS warnings, which can improve the driver's experience while also improving safety due to improved driver attentiveness or responsiveness. For example, some drivers may be less responsive to certain default or predetermined ADAS warnings, which could result in the driver being unresponsive when his/her attention is needed, such as to take over control of the vehicle during a particular situation. The ADAS and corresponding methods herein therefore match the driver's identity to a stored profile (or, in the event there is no stored profile, creates a new stored profile). This profile is then utilized to provide user-specific ADAS warnings and is also periodically updated based on the driver's responsiveness thereto over time. Non-limiting examples of ADAS features that could utilize these adaptive driver-specific ADAS warnings include adaptive cruise control (ACC), collision avoidance, lane departure and blind spot monitoring, and lane keeping or centering, but it will be appreciated that these techniques are applicable to any suitable vehicle ADAS features or similar (e.g., driver take over, or DTO features).

Figure 1:
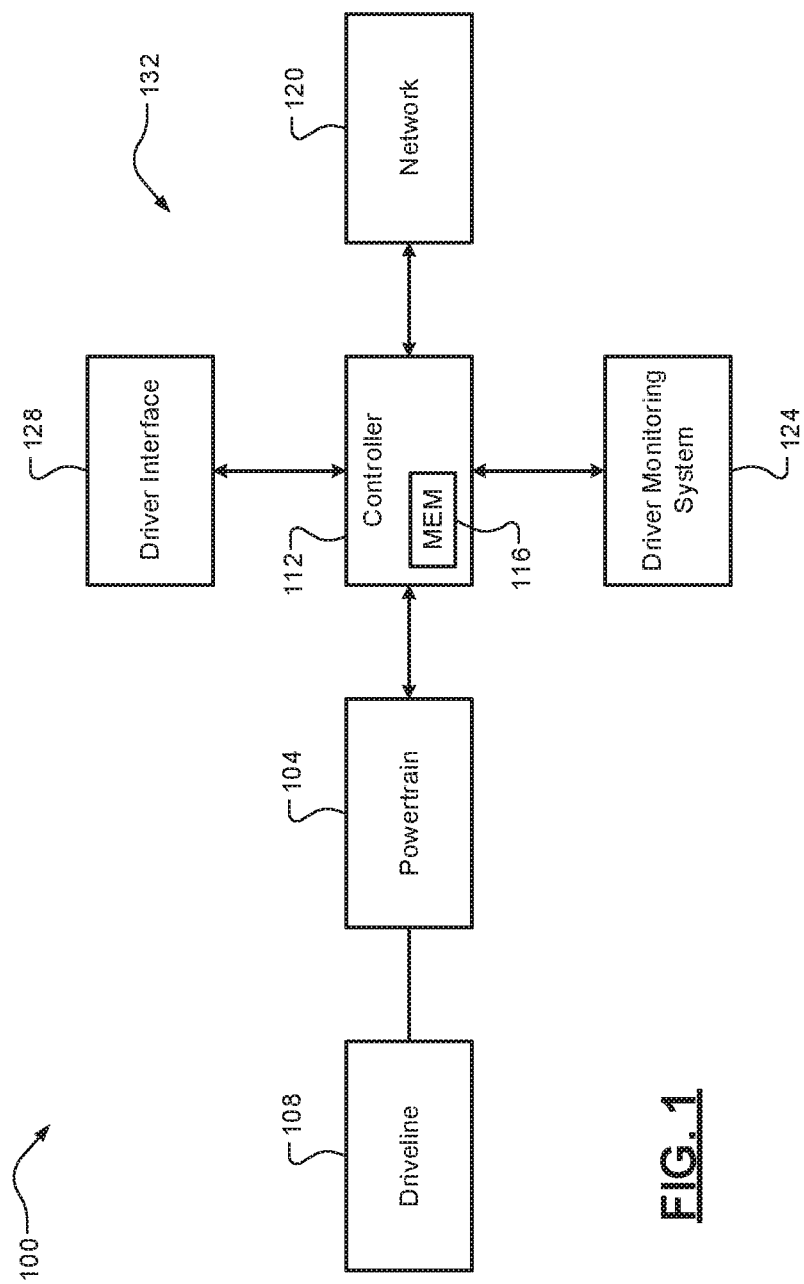
FIG. 1 is a functional block diagram of a vehicle having an example automated driver assistance system (ADAS) according to the principles of the present disclosure.

Referring now to FIG. 1, a functional block diagram of an example vehicle 100 having an ADAS according to the principles of the present disclosure is illustrated. The vehicle 100 comprises a powertrain 104 (an engine, an electric motor, combinations thereof, etc.) that generates drive torque and transfers the drive torque (e.g., via a transmission) to a driveline 108 of the vehicle 100 for propulsion. A controller 112 controls operation of the vehicle 100, including controlling the powertrain 104 to generate a desired amount of drive torque (e.g., based on a driver torque request, such as one received via an accelerator pedal). The controller 112 is also configured to perform at least a portion of the ADAS techniques of the present disclosure. The controller 112 stores driver ADAS profiles either locally at an internal or external memory (MEM) 116 (e.g., non-volatile memory) or stores and retrieves driver ADAS or "user profiles" from remote storage (e.g., a remote server) via a network 120. The controller 112 utilizes a driver monitoring system 124 to ascertain an identity of the driver of the vehicle 100. The driver monitoring system 124 comprises a system of sensors (infrared sensor(s), camera(s), etc.) that are typically operated to monitor an attentiveness of the driver.

For purposes of this disclosure, the driver monitoring system 124 is configured to determine a set of features of the driver and then match these features to a user profile. One non-limiting example of this set of features is facial recognition features (eye spacing, face shape, etc.). While a driver monitoring system is specifically described herein as monitoring a driver of the vehicle for the purpose of determining an identity of the driver, it will be appreciated that additional or other systems could be utilized to determine the identity of the driver. These other systems could include, for example, but not limited to, voice identification, fingerprint identification, phone identification, and the like. For example only, one mobile phone could be detected upon starting the vehicle and the identity (e.g., user profile) connected to that mobile phone could be determined to be the identity of the driver.

It will be appreciated that the driver may have to opt-in to having his/her identity monitored and matched as described herein. When the identity of the driver matches a stored user profile, that user profile (a "target user profile") is retrieved for subsequent usage. When the identity of the driver does not match any stored user profiles, however, a new driver user profile is created and subsequently utilized (i.e., as the target user profile). The target user profile defines a set of ADAS warnings. For a retrieved, existing user profile, these ADAS warnings have likely been tuned or calibrated for that specific driver. For a newly created user profile, the ADAS warnings will be default or predetermined ADAS warnings (e.g., for an average user), which can then be adjusted over time such that they are tuned or calibrated for that specific driver. The controller 112 will utilize the ADAS warnings specified by the target user profile to output ADAS warnings to the driver of during operation of the vehicle 100.

As previously discussed, and as described in more detail below, non-limiting examples of these types of ADAS warnings include visual, audible, and haptic outputs to the driver via a driver interface 128. Non-limiting examples of components of the driver interface 128 include visual actuators such as a touch display and lights (e.g., a light or instrument cluster), audible actuators such as speakers, and haptic actuators (e.g., vibrational devices). The controller 112, the memory 116 or network 120, the driver monitoring system 124, and the driver interface 128 can collectively be referred to as the ADAS system 132 of the vehicle 100, but it will be appreciated that the ADAS system 132 will likely include other components (e.g., other sensors, steering actuators, acceleration/brake actuators, etc.). Over time, the controller 112 can update the ADAS warnings in the target user profile based on the driver's reactions thereto during operation of the vehicle 100. For example, some ADAS warnings may not get the driver's attention, and thus the ADAS warnings in the target profile could be increased in severity or could be changed (e.g., from visual to audible or haptic).

Figure 2:
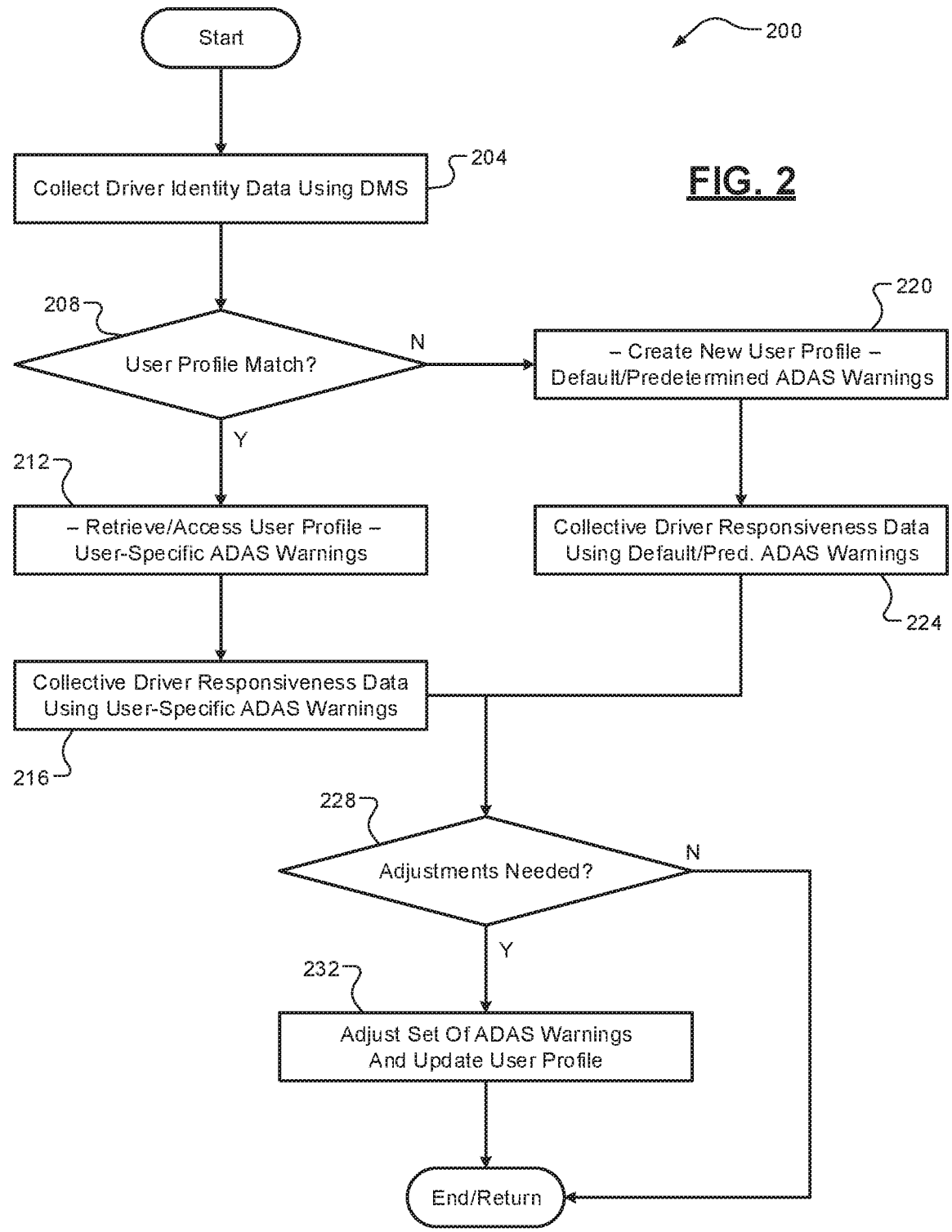
FIG. 2 is a flow diagram of an example method for determining and providing adaptive user-specific ADAS warnings for a vehicle according to the principles of the present disclosure.

Referring now to FIG. 2, a flow diagram of an example method 200 of determining and providing user-specific ADAS warnings for a vehicle according to the principles of the present disclosure is illustrated. While the method 200 is described with respect to vehicle 100 of FIG. 1, it will be appreciated that the method 200 could be applicable to any suitable vehicle. As previously discussed, one main safety aspect of autonomous driving is the timely response of the driver when his/her attention is needed. Drivers are often asked to take over control of the vehicle 100 due to various reasons (not paying attention to the road, bad weather, sensor unavailability, diagnostic errors, etc.), which is also known as driver take-over (DTO) requests. There are also other normal warnings, such as forward collision warnings, lane departure warnings, and the like, which aim to instruct the driver to exercise the control he or she already has. These ADAS alerts or warnings are typically set to go off at a specific time and are the same (type, intensity, etc.) for every driver. This is also referred to herein as default or predetermined ADAS warnings, which could be configured based on aggregate data indicative of an average driver. However, driver-specific ADAS warnings would be more desirable as they would be more effective across a broad spectrum of different drivers due to their personalization to each specific driver.

Method 200 begins at 204 where driver identity information is collected or gathered by the controller 112 using the driver monitoring system (DMS) 124. As previously discussed, this information could be a set of features indicative of an identify identity of the driver (e.g., facial recognition features). At 208, the controller 112 then attempts to match the driver's identity to one of a set of stored user profiles (e.g., at memory 116 or via network 120). When a match is found, the method 200 proceeds to 212. Otherwise, the method 200 proceeds to 220. At 212, the controller 112 accesses/retrieves the matched user profile (the target user profile) and the controller 112 loads the set of ADAS warnings of the target user profile, which have likely already been at least somewhat customized for that particular driver (e.g., based on previous driving history). At 216, the controller 112 monitors the responsiveness of the driver to the set of ADAS warnings of the target user profile during a period of operation of the vehicle 100. This monitoring could occur, for example, for a predetermined period of time or a predetermined mileage (e.g., 50 miles) worth of driving activity. The method 200 then proceeds to 228.

When the driver's identity does not match any of the stored user profiles, the method 200 proceeds to 220 where the controller 112 creates and stores a new user profile (the target user profile) with default or predetermined ADAS warnings (e.g., for the average driver) that are loaded for usage. At 224, the controller 112 monitors the responsiveness of the driver to the set of ADAS warnings of the target user profile during a period of operation of the vehicle 100. The method 200 then proceeds to 228. At 228, the controller 112 determines if any of the set of ADAS warnings needs to be adjusted. This could be determined in a variety of ways. For example, when the driver is unresponsive to a particular ADAS warning for longer than a calibratable response rate or time threshold, the controller 112 may adjust that particular ADAS warning. Alternatively, for example, when the driver is unresponsive to a particular ADAS warning for more than a calibratable number of response failure instances, the controller 112 may adjust that particular ADAS warning. Whether the above-described predetermined period of time or predetermined mileage worth of driving for the monitoring has occurred could also be a factor in determining whether adjustment is needed yet (i.e., when the monitoring duration/data is insufficient, adjustment may not yet be performed). When adjustment is needed, the controller 112 performs the adjusting at 232 and the method 200 ends or returns to 204. When adjustment is not needed, the method 200 ends or returns to 204.

The term "driver responsiveness" as used herein can refer to whether the driver takes timely and appropriate action to mitigate the cause of a warning or alert. This adjusting at 232 could include increasing the intensity or severity of the particular ADAS warning and/or changing its output type (visual audible, audible haptic, etc.). Other factors could also be taken into account which may impact the driver's responsiveness, such as gaze relative to the road, drowsiness level, driver health status, and current traffic and/or construction levels. For example, no change or a less extreme ADAS warning change could be made when other factors could be impacting the driver's responsiveness, such as high levels of traffic/construction. Different types and intensity levels of ADAS warnings could also be tried in order to determine a most effective means of alerting the particular driver (voice ADAS warnings, displayed text ADAS warnings, light ADAS warnings, audible sound ADAS warnings, etc.). For human machine interface (HMI) warnings, these could be adapted such that subsequent alerts or warnings change in order to learn what the driver reacts to. It will be appreciated that other factors could further affect how the ADAS warnings are adjusted. For example, the driver may have the vehicle's audio system set to a relatively high volume level, which could result in a louder audible ADAS warning or a different type of ADAS warning (e.g., a light-based ADAS warning). Weather conditions (snow/ice, rain, etc.) could also have an impact on how the driver would be expected to respond to a particular ADAS warning.

While changing the type and/or increasing the severity or intensity of ADAS warnings is described above, it will also be appreciated that less severe or intense ADAS warnings could be adjusted to be based on the driver's positive responsiveness to particular ADAS warnings. For example, the driver may be very responsive to a particular audible ADAS warning, and thus the controller 112 could potentially reduce the severity or intensity (e.g., the volume) of the particular ADAS warning. This determination could be made, for example, when the particular ADAS warning is more severe or intense than the corresponding default or predetermined ADAS warning (e.g., for an average driver). While single types of ADAS warnings are described, it will also be appreciated that a particular ADAS warning could include multiple types of outputs (e.g., audible and visual outputs) to increase the likelihood of driver responsiveness. For example, by providing multiple types of outputs concurrently, the driver may be more likely to respond.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated driver assistance system (ADAS) for a vehicle, the ADAS comprising:
   one or more systems configured to determine a set of parameters indicative of an identity of a driver of the vehicle; and
   a controller configured to:
     determine an identity of the driver based on the set of parameters;
     access a memory configured to store a set of user profiles, each user profile defining a set of ADAS warnings;
     identify a target user profile based on whether the driver identity corresponds to any of the set of user profiles, including:
       when the driver identity does not correspond to any of the set of user profiles, create and store the target user profile as one of the set of user profiles at the memory, wherein the set of ADAS warnings defined by the target user profile includes a set of default or predetermined ADAS warnings, and
       when the driver identity does correspond to one of the set of user profiles, access that user profile as the target user profile, wherein the set of ADAS warnings defined by the target user profile includes a set of user-specific ADAS warnings for the driver of the vehicle; and
     during a period after identifying the target user profile:
       updating the set of ADAS warnings defined by the target user profile based on operation of the vehicle, and
       providing ADAS warnings based on the set of ADAS warnings defined by the target user profile.

2. The ADAS of claim 1, wherein in response to providing a particular ADAS warning of the set of ADAS warnings a threshold number of time, the controller is configured to update the particular ADAS warning of the set of ADAS warnings based on a response rate of the driver to the particular ADAS warning and a calibratable response rate threshold.

3. The ADAS of claim 1, wherein in response to providing a particular ADAS warning of the set of ADAS warnings a threshold number of times, the controller is configured to update the particular ADAS warning of the set of ADAS warnings based on a number of response failure instances of the driver to the particular ADAS warning and a calibratable response failure instance threshold.

4. The ADAS of claim 1, wherein the one or more systems comprise a driver monitoring system configured to monitor the driver of the vehicle, and wherein the controller is configured to update the set of ADAS warnings based on other driver-specific factors monitored by the driver monitoring system including at least one of (i) a gaze of the driver relative to a road, (ii) a level of drowsiness of the driver, and (iii) a health status of the driver.

5. The ADAS of claim 1, wherein the controller is configured to update the set of ADAS warnings based on other non-driver-specific factors including at least one of (i) a current road traffic level and (ii) a current road construction level.

6. The ADAS of claim 1, wherein the controller is configured to update a particular ADAS warning of the set of ADAS warnings by changing an output type of the ADAS warning.

7. The ADAS of claim 6, wherein the output type of the ADAS warning is one of a visual output, an audible output, and a haptic output.

8. The ADAS of claim 1, wherein at least some of the set of user-specific ADAS warnings have a different degree or severity than respective ones of the set of default or predetermined ADAS warnings.

9. The ADAS of claim 8, wherein the set of user-specific ADAS warnings are uniquely tuned to a particular driver of the vehicle such that the particular driver is as responsive as possible to the set of user-specific ADAS warnings.

10. A method for determining and providing adaptive user-specific automated driver assistance system (ADAS) warnings for a vehicle, the method comprising:
    determining, by a controller of the vehicle, an identity of a driver of the vehicle;
    accessing, by the controller, a memory configured to store a set of user profiles, each user profile defining a set of ADAS warnings;
    identifying, by the controller, a target user profile based on whether the driver identity corresponds to any of the set of user profiles, including:
      when the driver identity does not correspond to any of the set of user profiles, creating and storing the target user profile as one of the set of user profiles at the memory, wherein the set of ADAS warnings defined by the target user profile includes a set of default or predetermined ADAS warnings, and
      when the driver identity does correspond to one of the set of user profiles, accessing that user profile as the target user profile, wherein the set of ADAS warnings defined by the target user profile includes a set of user-specific ADAS warnings for the driver of the vehicle; and
    during a period after identifying the target user profile:
      updating, by the controller, the set of ADAS warnings defined by the target user profile based on operation of the vehicle, and providing, by the controller, ADAS warnings based on the set of ADAS warnings defined by the target user profile.

11. The method of claim 10, wherein the updating of a particular ADAS warning of the set of ADAS warnings is performed in response to providing the particular ADAS warning a threshold number of times and is based on a response rate of the driver to the particular ADAS warning and a calibratable response rate threshold.

12. The method of claim 10, wherein the updating of a particular ADAS warning of the set of ADAS warnings is performed in response to providing the particular ADAS warning a threshold number of times and is based on a number of response failure instances of the driver to the particular ADAS warning and a calibratable response failure instance threshold.

13. The method of claim 10, wherein the determining of the identity of the driver of the vehicle is performed using a driver monitoring system configured to monitor the driver of the vehicle, and wherein the updating of the set of ADAS warnings is based on other driver-specific factors monitored by the driver monitoring system including at least one of (i) a gaze of the driver relative to a road, (ii) a level of drowsiness of the driver, and (iii) a health status of the driver.

14. The method of claim 10, wherein the updating of the set of ADAS warnings is based on other non-driver-specific factors including at least one of (i) a current road traffic level and (ii) a current road construction level.

15. The method of claim 10, wherein the updating of a particular ADAS warning of the set of ADAS warnings includes changing an output type of the ADAS warning.

16. The method of claim 15, wherein the output type of the ADAS warning is one of a visual output, an audible output, and a haptic output.

17. An automated driver assistance system (ADAS) for a vehicle, the ADAS comprising:
   identity determination means for determining an identity of a driver of the vehicle;
   user profile storage means for accessing and storing a set of user profiles, each user profile defining a set of ADAS warnings;
   target user profile identification means for identifying a target user profile based on whether the driver identity corresponds to any of the set of user profiles, including:
      when the driver identity does not correspond to any of the set of user profiles, creating and storing the target user profile as one of the set of user profiles at the user profile storage means, wherein the set of ADAS warnings defined by the target user profile includes a set of default or predetermined ADAS warnings, and
      when the driver identity does correspond to one of the set of user profiles, accessing that user profile as the target user profile, wherein the set of ADAS warnings defined by the target user profile includes a set of user-specific ADAS warnings for the driver of the vehicle;
   ADAS warning updating means for, during a period after identifying the target user profile, updating the set of ADAS warnings defined by the target user profile based on operation of the vehicle; and
   ADAS warning provision means for providing ADAS warnings based on the set of ADAS warnings defined by the target user profile.

18. The ADAS of claim 17, wherein in response to providing a particular ADAS warning of the set of ADAS warnings a threshold number of times, the ADAS warning updating means updates the particular ADAS warning of the set of ADAS warnings based on a response rate of the driver to the particular ADAS warning and a calibratable response rate threshold.

19. The ADAS of claim 17, wherein in response to providing a particular ADAS warning of the set of ADAS warnings a threshold number of times, the ADAS warning updating means updates the particular ADAS warning of the set of ADAS warnings based on a number of response failure instances of the driver to the particular ADAS warning and a calibratable response failure instance threshold.

20. The ADAS of claim 17, wherein the ADAS warning updating means updates a particular ADAS warning of the set of ADAS warnings by changing an output type of the ADAS warning, wherein the output type of the ADAS warning is one of a visual output, an audible output, and a haptic output.

* * * * *